United States Patent Office 3,372,164

Patented Mar. 5, 1968

1

3,372,164

BENZENESULFONYL SEMICARBAZIDES

Erich Haack, Heidelberg, and Ruth Heerdt and Kurt Stach, Mannheim, and Felix H. Schmidt, Mannheim-Neuostheim, Germany, assignors to C. F. Boehringer & Soehne G.m.b.H., Mannheim-Waldhof, Germany, a corporation of Germany No Drawing. Filed Aug. 25, 1964, Ser. No. 392,041
Claims priority, application Germany, Sept. 3, 1963, B 73,366
9 Claims. (Cl. 260—292)

ABSTRACT OF THE DISCLOSURE

A novel class of chemical compounds characterized by blood sugar reducing activity is disclosed. The compounds and their alkali metal, alkaline earth metal and ammonium salts are characterized by the following formula for the free base

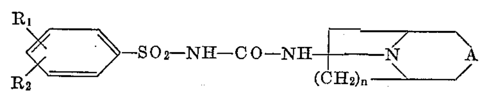

in which $R_1$ and $R_2$ are selected from the group consisting of hydrogen, halogen, alkyl, alkenyl, alkoxy, alkenoxy, alkylmercapto, acyl, azido, and trifluoromethyl; A is selected from the group consisting of methylene ($>CH_2$), carbonyl ($>CO$) and hydroxymethylene ($>CHOH$) which can be etherified or esterified and $n$ is 1 or 2.

This invention relates to certain new pharmacologically active benzenesulfonyl semicarbazides and the nontoxic salts thereof.

The new chemical compounds according to this invention have utility as anti-diabetic agents and have a minimum of side effects. More particularly the new compounds according to this invention have utility as oral anti-diabetic agents.

It is known that various benzenesulfonyl semicarbazides have blood-sugar reducing properties and are suitable for use as oral anti-diabetic agents ("Arzneimittel-Forschung," vol. 8, pp. 448–454 (1958)). In particular $N_1$-sulfanilyl-$N_2$-(n-butyl)-urea and $N_1$-(4-methylbenzenesulfonyl)-$N_2$-(n-butyl)-urea have achieved considerable importance in the treatment of diabetes.

A primary object of the present invention is the development of a new series of therapeutically useful compounds.

A further object of the invention is the development more particularly of a new group of chemical compounds characterized by blood-sugar reducing activity.

Still a further object of the present invention is the provision of a form of benzenesulfonyl semicarbazide compounds in accordance with the invention in which the compounds are possessed of the highest degree of activity.

Still a further object of the present invention is the development of anti-diabetic compositions embodying the free benzene-sulfonyl-semicarbazide compound, in accordance with the invention or its salt.

Still a further object of the present invention is the development of anti-diabetic compositions embodying the free benzene-sulfonyl-semicarbazide compound or its salt in dosage unit form.

The foregoing and other objects and advantages will be manifested to those skilled in the art from the following description.

In accordance with the invention, it has now been found

2 that the benzenesulfonyl semicarbazides having the structure shown by the following formula:

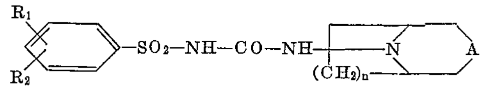

in which $R_1$ and $R_2$ are selected from the group consisting of hydrogen, halogen, alkyl, alkenyl, alkoxy, alkenoxy, alkylmercapto, acyl, azido, and trifluoromethyl; A is selected from the group consisting of methylene ($>CH_2$), carbonyl ($>CO$) and hydroxymethylene ($>CHOH$) which can be etherified or esterified and $n$ is 1 or 2 are characterized by a very strong blood-sugar reducing effect with little danger of side effects even over prolonged periods of administration. The excellent tolerance to the compounds makes possible the use of the new compounds as oral antidiabetic agents, treatment of the individual over a broad range as concerns dosage level required for effectiveness of the agent, duration of treatment, as well as variations in either or both of these factors as may be required in individual instances.

The benzenesulfonyl semicarbazide compounds of the present invention are prepared by the following synthesis procedures:

(a) Reaction of benzenesulfonyl compounds having the structure shown in the following formula:

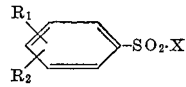

with compounds of the formula

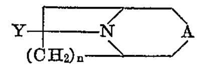

wherein one of X and Y is an amino group while the other is an isocyanate group or a group which under the conditions of the reaction is converted into an isocyanate group; $R_1$, $R_2$, A and $n$ are as given above. (Where hereinafter the symbols $R_1$, $R_2$, A, X, Y, and $n$ are mentioned in the description, they will indicate the substituent indicated for them in connection with the above formula except where otherwise specifically indicated.)

In this reaction, for example, a sulfonyl isocyanate can be reacted with N-amino-nortropan or N-amino-norgranatan or an acyl derivative thereof, or, in reverse of this reaction, a sulfonamide advantageously in the form of the sodium or potassium salt can be condensed with a nortropan or norgranatan isocyanate former. It will be understood that the term "isocyanate former" as used herein is a compound which is capable of giving rise to an isocyanic acid ester under the conditions of reaction as for example the corresponding carbaminic acid halides, urethanes, thiourethanes, and ureas, as well as their acyl derivatives, disulfonyl ureas, and the semicarbazides.

(b) Hydrolysis of benzenesulfonyl semicarbazide-derivatives having the structural formula:

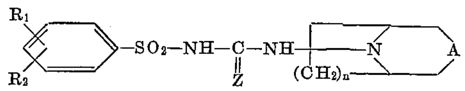

wherein Z is a sulfur atom or an imino group, or benzenesulfonyl isosemicarbazide ethers shown by the formula:

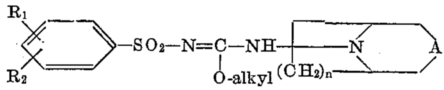

It is advantageous to convert the sulfonyl guanidines by alkaline hydrolysis as for instance by means of alkali hydroxide, that of the isourea alkyl ethers by acid hydrolysis, for instance by means of hydrogen halide and that of the thioureas by oxidative hydrolysis as for instance by means of nitrous acid.

(c) Reaction of benzenesulfonyl halides having the structural formula:

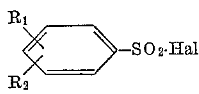

with semicarbazides shown by the formula:

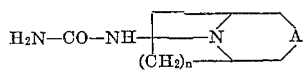

In this latter reaction there may be advantageously used in place of the alkylene semicarbazides, the corresponding parabanic acid derivatives:

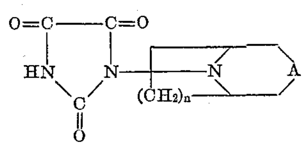

This invention will be further clarified by the following examples but it is not intended that the same be taken as limitative thereof.

*Example 1.*—*$N_1$-(p-chlorobenzenesulfonyl)-$N_2$-[norgranatanyl-(9)]-urea*

7.8 g. N-aminonorgranatan hydrochloride were added to 20 cc. methanol in which 1.02 g. sodium had been dissolved. The methanol was then distilled off under nitrogen and slowly replaced with absolute toluene. When the methanol had been fully distilled off, 10 g. p-chlorobenzene-sulfonyl isocyanate were added with stirring at 0° C. The semicarbazide which was produced separated out as crystals. The crystals were recovered by suction filtering and converted into the corresponding sodium salt by reaction with molar quantities of a concentrated soda solution. Following recrystallization from water, the salt thereby obtained melted at 328–330° C. The semicarbazide which was freed from the salt by acid treatment fused at 220° C.

*Example 2.*—*$N_1$-benzenesulfonyl-$N_2$-[norgranatanyl-(9)]-urea*

3.9 g. N-aminonorgranatan hydrochloride were dissolved in 10 cc. methanol, in which 0.5 g. sodium had been dissolved. The methanol was distilled off under nitrogen and slowly replaced by absolute toluene. After cooling, 5.1 g. benzenesulfonylethylurethane were added and the resulting mixture was heated for 3 hours at 110–120° C. The desired semicarbazide crystallized out and was removed by suction filtering and washed with ether. The melting point of the semicarbazide thus produced was 234–236° C. Yield: 76.5%.

In an analogous manner, the following substances were obtained:

| | Fusion point, ° C. |
|---|---|
| $N_1$-(p-toluenesulfonyl)-$N_2$-[norgranatanyl-(9)]-urea | 228 |
| $N_1$-(p-isopropylbenzenesulfonyl)-$N_2$-[norgranatanyl-(9)]-urea | 240 |
| $N_1$-(p-methylmercaptobenzenesulfonyl)-$N_2$-[norgranatanyl-(9)]-urea | 220 |
| $N_1$-(p-methoxybenzenesulfonyl)-$N_2$-[nortropanyl-(8)]-urea | 171–173 |
| $N_1$-(p-chlorobenzenesulfonyl)-$N_2$-[nortropanyl-(8)]-urea | 212 |

The effectiveness of the compounds of the invention as anti-diabetic agents was determined by determining their ability to reduce blood sugar. The blood sugar reducing effect was determined using the rabbit following administration of the test compounds, both intravenously and perorally. In each case the so-called threshold dose was determined, that is the smallest dose of compound which would produce a significant blood sugar reduction.

The following compounds were employed in the evaluation:

(1) $N_1$-benzenesulfonyl-$N_2$-[norgranatanyl-(9)]-urea
(2) $N_1$-(p-toluenesulfonyl)-$N_2$-[norgranatanyl-(9)]-urea
(3) $N_1$-(p-methoxybenzenesulfonyl)-$N_2$-[nortropanyl-(8)]-urea
(4) $N_1$-(p-methylmercaptobenzenesulfonyl)-$N_2$-[norgranatanyl-(9)]-urea
(5) $N_1$-(p-isopropylbenzenesulfonyl)-$N_2$-[norgranatanyl-(9)]-urea
(6) $N_1$-(p-chlorobenzenesulfonyl)-$N_2$-[nortropanyl-(8)]-urea
(7) $N_1$-(p-chlorobenzenesulfonyl)-$N_2$-[norgranatanyl-(9)]-urea
(8) $N_1$-sulfanilyl-$N_2$-(n-butyl)-urea ("Nadisan," "Invenol" or "Carbutamid")

In the following table, relative values are additionally given with reference to $N_1$-sulfanilyl-$N_2$-(n-butyl)-urea which is taken as equal to 1; the threshold dose of $N_1$-sulfanilyl-$N_2$-(n-butyl)-urea amounts to 200 mg./kg. in this experimental arrangement.

TABLE

| Compound | Threshold dose i.v. (mg./kg.) | Rabbits p.o. | Relative blood sugar reducing effect | |
|---|---|---|---|---|
| | | | I.v. | P.o. |
| 1 | 5 | 200 | 40 | 1 |
| 2 | 5 | 20 | 40 | 10 |
| 3 | 2.5 | 2.5 | 80 | [1] 80 |
| 4 | 10 | 20 | 20 | 10 |
| 5 | ---------- | 20 | (2) | 10 |
| 6 | 1.5 | 5 | 80 | 40 |
| 7 | 5 | 10 | 40 | [3] 20 |

[1] Compound has an abrupt blood sugar reducing effect; intravenously, e.g. under 10 mg./kg. 40% reduction; effect continues for 7 hours. When it is administered perorally, the blood sugar reduction sets in slowly and continues to the end of the experiment.
[2] Could not be determined.
[3] Even in the case of very small doses, both intravenously and perorally, the blood sugar reductions continue undiminished over the experimental period of 7 hours. Reduction averages 30–35%.

As is apparent from the above table, the compounds in accordance with the invention all have a substantially better effect as blood sugar reducing agents than does the $N_1$-sulfanilyl-$N_2$-(n-butyl)-urea.

If the relative blood sugar values of the above table are divided by 10, we find the relative effectiveness as compared with the known commercial preparation:

$N_1$-(p-toluenesulfonyl)-$N_2$-(n-butyl)-urea ("Rastinon," "Artosin," or "Tolbutamide").

This oral antidiabetic has a threshold dose of 20 mg./kg. when administered intravenously. The products of the invention are, therefore, superior to this compound.

If the relative blood sugar values of the above table are divided by 20, we obtain the effectiveness as compared with the known oral antidiabetic agent:

$N_1$-(p-chlorobenzenesulfonyl)-$N_2$-propylurea ("Diabinese" or "Chloropropamid").

The threshold dose of this substance when administered i.v. amounts to 10. With the exception of compound 4 ($N_1$ - (p - methylmercaptobenzenesulfonyl)-$N_2$-[norgranatanyl-(9)]-urea) the products of the invention are all superior to this known compound.

The products of this invention may be combined with a pharmaceutical carrier for administration to humans in an amount to obtain the desired pharmaco-dynamic effect, specifically a blood sugar reducing effect. Such carriers are either solid or liquid. The solid pharmaceutical carriers include any compatible and edible tabletting material used in the pharmaceutical practice, such as cornstarch, lactose, stearic acid, mannitol, magnesium stearate, talc, methyl cellulose, and the like. The compounds of the invention are mixed with the carrier and built into hard gelatin capsules or tabletted with suitable tabletting aids including lubricants, disintegrants, and/or coloring agents.

Examples of liquid carriers include aqueous and oily bases. The oily bases include, for instance, such edible oils, as corn oil, cottonseed oil, coconut oil, peanut oil, sesame oil, mixtures of these and the like.

Though single dosage units on a 24-hour maintenance basis, require about 100 mg. per person of the product in accordance with the invention, it may sometimes be desirable to make the product intended for the patient to contain only about ½ or less of the daily unit dosage amounts, these to be incorporated into individual portions. Thus, it may be desirable to prepare tablets, capsules, etc. containing only 50 mg. or even less of the products in accordance with the invention.

The compounds in accordance with the invention are essentially acid in nature and form alkali metal-, alkaline earth metal- and ammonium salts and especially potassium-, sodium- and magnesium salts as well as salts with various organic amines which are compatible with the human system. Such salts are prepared in the usual manner, for instance, by adding the metal or ammonium hydroxide to the sulfonyl semicarbazide compound. It is also possible to produce salts with organic bases which are compatible with the human system in the amounts administered.

The salts set forth herein are useful in the treatment of diabetes in like manner as the acid compounds set forth herein administered in the same dosage and in the time sequence as said compounds. The more water-soluble the salt the more preferred is its application, ammonium salts giving particularly good results.

What is claimed is:

1. A compound having the formula:

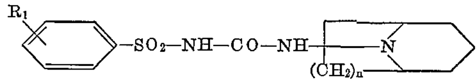

wherein $R_1$ is a member selected from the group consisting of hydrogen, halogen, lower alkyl, lower alkoxy and lower alkylmercapto and $n$ is an integer from 1 to 2.

2. A non-toxic pharmacologically acceptable salt of a compound having the formula:

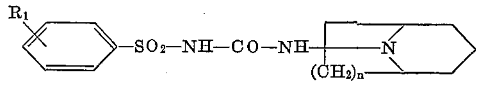

wherein $R_1$ is a member selected from the group consisting of hydrogen, halogen, lower alkyl, lower alkoxy and lower alkylmercapto and $n$ is an integer from 1 to 2.

3. $N_1$ - (p - chlorobenzenesulfonyl)-$N_2$-[norgranatanyl-(9)]-urea.

4. $N_1$-benzenesulfonyl-$N_2$-[norgranatanyl-(9)]-urea.

5. $N_1$ - (p - toluenesulfonyl)-$N_2$-[norgranatanyl-(9)]-urea.

6. $N_1$ - (p-isopropylbenzenesulfonyl)-$N_2$-[norgranatanyl-(9)]-urea.

7. $N_1$ - (p - methylmercaptobenzenesulfonyl)-$N_2$-[norgranatanyl-(9)]-urea.

8. $N_1$ - (p - chlorobenzenesulfonyl)-$N_2$-[nortropanyl-(8)]-urea.

9. $N_1$ - (p-methoxybenzenesulfonyl)-$N_2$-[nortropanyl-(8)]-urea.

References Cited

Burger: Medicinal Chemistry, Interscience, 2nd ed., p. 808 (1960).

NORMA S. MILESTONE, *Acting Primary Examiner.*

WALTER A. MODANCE, *Examiner.*

A. ROTMAN, *Assistant Examiner.*